United States Patent [19]
Walker et al.

[11] Patent Number: 6,122,629
[45] Date of Patent: Sep. 19, 2000

[54] FILESYSTEM DATA INTEGRITY IN A SINGLE SYSTEM IMAGE ENVIRONMENT

[75] Inventors: Bruce J. Walker, Rolling Hills Estates; David B. Zafman, Culver City; William W. Chow, Upland, all of Calif.

[73] Assignee: Compaq Computer Corporation, Houston, Tex.

[21] Appl. No.: 09/070,897

[22] Filed: Apr. 30, 1998

[51] Int. Cl.[7] .................................................. G06F 17/30
[52] U.S. Cl. ........................... 707/8; 707/202; 707/201; 707/200
[58] Field of Search ......................... 707/8, 201, 202; 707/200; 711/143, 151

[56] References Cited

U.S. PATENT DOCUMENTS

| | | | |
|---|---|---|---|
| 4,807,118 | 2/1989 | Lin et al. ................................. | 364/200 |
| 4,819,159 | 4/1989 | Shipley et al. .......................... | 364/200 |
| 4,887,204 | 12/1989 | Johnson et al. ........................ | 707/10 |
| 5,001,628 | 3/1991 | Johnson et al. ........................ | 364/200 |
| 5,151,989 | 9/1992 | Johnson et al. ........................ | 395/600 |
| 5,175,852 | 12/1992 | Johnson et al. ........................ | 395/600 |
| 5,454,108 | 9/1995 | Devarakonda et al. ................ | 395/650 |
| 5,513,314 | 4/1996 | Kandasamy et al. ................... | 395/182.04 |
| 5,566,297 | 10/1996 | Devarakonda et al. ............... | 395/182.13 |
| 5,628,014 | 5/1997 | Cecchini et al. ....................... | 707/205 |
| 5,659,682 | 8/1997 | Devarakonda et al. ............... | 395/184.01 |
| 5,812,748 | 9/1998 | Ohran et al. ........................... | 395/182.02 |
| 5,826,253 | 10/1998 | Bredenberg ............................ | 707/2 |
| 5,875,290 | 2/1999 | Bartfai et al. .......................... | 395/182.11 |
| 5,924,116 | 7/1999 | Aggarwal et al. ..................... | 711/122 |
| 5,996,086 | 11/1999 | Delaney et al. ........................ | 714/4 |
| 6,044,475 | 3/2000 | Chung et al. ........................... | 714/15 |

OTHER PUBLICATIONS

Sun Microsystems, "The NFS Distributed File Service–Preserving File Integrity", NFS White Paper, http://www.sun.com/software/white-papers/wp-nfs/nfs_13.html;$sessionid$IE2QZTIAAYC3JAMUVFZE5YQ#34514, Mar. 1995, pp. 1–2.

*Primary Examiner*—Thomas G. Black
*Assistant Examiner*—William Trinh
*Attorney, Agent, or Firm*—Fenwick & West LLP

[57] ABSTRACT

A system for protection of filesystem data integrity within a computer cluster is provided. The system uses redundant data caches at client and server nodes within the computer cluster. Caching of filesystem data is controlled so that non-shared files are preferably cached at client nodes. This increases filesystem performance within the computer cluster and ensures that failures may not result in a loss of modified filesystem data without a corresponding loss to the process(es) accessing that data. Shared files are cached at the server node and a backup cache node. This protects modified filesystem data against any single node failure.

8 Claims, 8 Drawing Sheets

FILESYSTEM DATA INTEGRITY IN A SINGLE SYSTEM IMAGE ENVIRONMENT

RELATED APPLICATIONS

The following application claims the benefit of US Provisional application Ser. No. 60/066,012 entitled "Filesystem Failover in a Single System Image Environment" by Bruce Walker, filed Nov. 11, 1997, the disclosure of which is incorporated in this document by reference.

The following patent applications, which were filed on Apr. 30, 1998, are related to the subject application and are herein incorporated by reference:

Application Ser. No. 09/071,145, entitled "Filesystem Failover in a Single System Image Environment" of Bruce J. Walker, John L. Byrne, William W. Chow, John A. Gertwagen, Laura L. Ramirez and David B. Zafman (Attorney Docket No. 23896.382).

Application Ser. No. 09/071,048, entitled "Root Filesystem Failover in a Single System Image Environment" of Bruce J. Walker and John L. Byrne (Attorney Docket No. 23896.335).

FIELD OF THE INVENTION

The present invention relates generally to techniques for increasing the availability of computer filesystems. More specifically, the present invention includes a method and apparatus for increasing filesystem data integrity in an environment where the filesystem is shared by a group of computers.

BACKGROUND OF THE INVENTION

Computer clusters are an increasingly popular alternative to more traditional computer architectures. A computer cluster is a collection of individual computers (known as nodes) that are interconnected to provide a single computing system. The use of a collection of nodes has a number of advantages over more traditional computer architectures. One easily appreciated advantage is the fact that nodes within a computer cluster may fail individually. As a result, in the event of a node failure, the majority of nodes within a computer cluster may survive in an operational state. This has made the use of computer clusters especially popular in environments where continuous availability is required.

Single system image (SSI) clusters are a special type of computer cluster. SSI clusters are configured to provide programs (and programmer's) with a unified environment in which the individual nodes cooperate to present a single computer system. Resources, such as filesystems, are made transparently available to all of the nodes included in an SSI cluster. As a result, programs in SSI clusters are provided with the same execution environment regardless of their physical location within the computer cluster. SSI clusters increase the effectiveness of computer clusters by allowing programs (and programmers) to ignore many of the details of cluster operation. Compared to other types of computer clusters, SSI clusters offer superior scaleablity (the ability to incrementally increase the power of the computing system), and manageability (the ability to easily configure and control the computing system). At the same time, SSI clusters retain the high availability of more traditional computer cluster types.

As the size of a computer cluster increases, so does the chance for failure among the cluster's nodes. Failure of a node has several undesirable effects. One easily appreciated effect is the performance degradation that results when the work previously performed by a failed node is redistributed to surviving nodes. Another undesirable effect is the potential loss of a resource, such as a filesystem, that is associated with a failed node.

Node loss can be especially serious in SSI clusters. This follows because resources can be transparently shared within SSI clusters. Sharing of resources means that a single resource may be used by a large number of processes spread throughout an SSI cluster. If node failure causes the resource to become unavailable, each of these processes may be negatively impacted. Thus, a single node failure may impact many processes. Resource sharing also increases the likelihood that a process will access resources located on a number of different nodes. In so doing, the process becomes vulnerable to the failure of any of these nodes.

In SSI clusters, filesystems are one of the most commonly shared resources. Thus, filesystem reliability and fault-tolerance is especially important to the operation of SSI clusters. Filesystem performance is also important to the operation of SSI clusters. To increase filesystem performance, it is often necessary to aggressively cache filesystem data at each node where the filesystem is used. Caching at each node is complicated by the need to maintain the consistency of the filesystem and the filesystem caches at each node. This is especially true in the event of node failure.

Distributed caching is further complicated by the possibility that files may be shared, or opened for modification on more than a single node. Obviously, shared files must be seen consistently at each node within the cluster. One method for providing this type of consistency is to prevent shared files from being cached. This means that shared files are always directly accessed as part of the filesystem where they are located. This technique provides the required consistency, but limits filesystem performance.

Based on the foregoing, it is clear that there is a need for techniques that balance the need to achieve high-performance filesystem operation and the need to provide fault-tolerance. This is especially in true in the case of files that are shared or opened for modification on multiple nodes.

SUMMARY OF THE INVENTION

An embodiment of the present invention includes a method and apparatus for various levels of filesystem data integrity in an SSI cluster. A representative environment for the present invention includes an SSI computer cluster. The SSI computer cluster includes a series of individual computer systems referred to as nodes. For the described embodiment, the nodes of the SSI computer cluster operate under control of UNIX® or UNIX-like operating systems.

Within the SSI cluster, each filesystem is preferably located on a dual-ported disk (or other media that is accessible by more than one node). This allows each disk, and each filesystem, to be associated with two nodes: an active server node and a standby server node. Filesystems are mounted on their active server nodes as UNIX® filesystems. The standby server nodes provide alternate mounting points for filesystems made inaccessible by failure of active server nodes. Filesystems may also be located on single ported disks. Access to filesystems located on single-ported disks is delayed during failure of active server nodes.

The SSI cluster includes one or more instances of a cluster filesystem, or CFS. Each CFS instance is a stackable filesystem that overlays the cluster's UNIX® filesystems. For generality, these UNIX® filesystems are referred to in this document as physical filesystems, or PFS. Each node on which a filesystem is accessed has a CFS client instance for that filesystem. The active server node for a filesystem has a CFS server instance for the filesystem. Together the CFS server instances and CFS client instances provide a distributed, client/server presence for filesystems within the SSI cluster. Processes access filesystems by interacting with CFS client instances. The CFS client instances, in turn, translate these interactions into interactions with CFS server instances. CFS server instances then interact with their underlying physical filesystems. It should be noted that CFS client instances may be located within active server nodes. This is referred to as client-at-server operation.

CFS includes filesystem data caches within each CFS client instance. In addition, the PFS typically includes a data cache that reflects the file changes that the PFS receives from the CFS client instance via the CFS server instance. CFS uses these caches to enhance filesystem performance within the SSI cluster. CFS also includes a backup server cache. For some operational modes, CFS uses the backup server cache to store copies of modified file data stored at the active server node. The backup server cache may be included within any node that is remote from the CFS server instance.

An embodiment of the present invention provides a system that provides configurable protection of the data within these caches during various forms of node failure within the SSI cluster. Preferably, this system is configurable on filesystem-by-filesystem basis to provide one of two levels of data protection: data integrity level one or data integrity level two.

Data integrity level two ensures that all changes made to a filesystem survive the failure of any single node within the SSI cluster. Data integrity level one is similar to data integrity level two. In data integrity level one, however, changes made prior to a node failure are only protected from being lost if any processes that may have seen the changes also survive the node failure. Thus, changes may be lost if there are no surviving processes that either created the changes or read the changes.

CFS uses a number of criteria to determine how and where to cache each file. These criteria include the data integrity level of the filesystem being cached. The criteria also include the file's sharing state. This state is defined by the way in which a file is opened on the nodes from which the file is being accessed. If two or more processes on different nodes have opened the same file and their uses of the file conflict, the file is shared. Files that are only opened on one node are not considered to be shared, even if they are opened multiple times on that node.

CFS is configured to preferably cache non-shared files at the CFS client instances where they are accessed. This increases CFS performance because non-shared files are cached at the point where they are accessed. For data integrity level one, cached changes to non-shared files are forwarded to the appropriate CFS server instance on a convenience or performance basis. Typically, CFS client instances will forward cached changes when it become advantageous to reduce the size of the clients' data caches. After forwarding, remote CFS client instances (i.e., CFS client instances not located on the same node as their CFS server instances) continue to cache modified file data until the data is written to disk. Local CFS clients (i.e., CFS client instances located on the same node as their CFS server instances, also known as client-at-server operation) do not have to continue to cache modified file data after forwarding. Upon receiving the forwarded data from a CFS client instance, the CFS server instance synchronously passes the data onto the PFS.

For data integrity level one protection of non-shared files, file changes remain cached on the same node that includes the processes that either created them or may have read them. Changes made to non-shared files in a filesystem may be lost during the failure of a CFS client instance, but the processes that created or may have read the changes will also be lost as a result of the failure. The overall result is changes made to non-shared files are protected against the failure of any single node if there are surviving processes that either created the changes or may have read the changes.

For data integrity level two, cached changes to non-shared files are forwarded to the appropriate CFS server instance on a synchronous basis. This means that modified file data is forwarded (and acknowledged) before the modifying operation is allowed to complete. After forwarding, remote CFS client instances continue to cache modified file data until the data is written to disk.

Local CFS client instances (i.e., client-at-server operation) do not have to continue to cache modified file data after forwarding. Upon receiving the forwarded data from a CFS client instance, the CFS server instance synchronously passes the data onto the PFS. In addition, if the forwarded data comes from the local CFS client instance, the CFS server instance also synchronously forwards the data to the backup cache node. As a result, modified file data is synchronously cached at two different nodes at once: either the remote client node and the active server node, or the active server node and the backup cache node. The overall result is changes made to non-shared files are protected against the failure of any single node regardless of whether any processes that created the changes or read the changes survive the failure.

For shared mode operation of both data integrity level one and data integrity level two, CFS is configured to preferably cache modified file data at both the active server node and the backup cache node. Caching at the active server node improves the efficiency of shared mode operation by avoiding the expense of propagating filesystem changes between multiple CFS client instances. Each backup server cache includes a copy of all modified file data cached at its associated active server node. To cache data at the active server node, remote CFS client instances ship all file functions to the active server node where they are performed by the local CFS client instances. This is referred to a function-shipping. Cached changes to shared files are then forwarded by the local CFS client instances to the CFS server instance on a synchronous basis. As with other operational modes, local CFS client instances (i.e., client-at-server instances) do not have to continue to cache modified file data after forwarding. Upon receiving the forwarded data from the local CFS client instances, the CFS server instance synchronously forwards the data to both the PFS and the backup cache node. As a result, modified file data is synchronously cached at two different nodes at once: the active server node and the backup cache node. For shared files, there will be one or more processes surviving any single node failure. The overall result is that changes made to shared files are protected against any single node failure.

An embodiment of the present invention includes a system for detecting file sharing. Detection of file sharing allows CFS to dynamically switch between shared or non-shared mode, on a file-by-file basis, depending on the sharing state of each file. Performing operations in the appropriate mode is necessary to determine where modified file data is cached, so that data loss can be detected in the event of a multi-node failure. When a multi-node failure occurs that results in the loss of modifications to a file, all CFS client instances that have the file open are notified to mark the opens in error. This allows surviving processes to detect data loss. To detect file sharing, each CFS server instance maintains a list that describes the sharing state of the server's currently open files. This is organized on a file-by-file basis and records, for each file, the identity of each CFS client instance that has the file open and the manner in which is opened.

Each time a file is opened, the CFS server instance performing the open consults its per-file list. The CFS server instance uses the identity of the CFS client instances that have the file open to determine the file's sharing state. If the sharing state indicates that the file is not shared, or shared in a non-conflicting fashion, non-shared mode operation begins. Otherwise, shared mode operation is initiated and CFS client instances function-ship all operations to the active server node.

Each CFS server instance updates the sharing state of each file each time the file is opened and closed. When a file switches from shared to non-shared, the CFS server instance arranges for non-shared mode operation to resume. When a file switches from non-shared to shared, the CFS server instance arranges for shared mode operation to resume.

Advantages of the invention will be set forth, in part, in the description that follows and, in part, will be understood by those skilled in the art from the description herein. The advantages of the invention will be realized and attained by means of the elements and combinations particularly pointed out in the appended claims and equivalents.

BRIEF DESCRIPTION OF THE DRAWINGS

The accompanying drawings, that are incorporated in and constitute a part of this specification, illustrate several embodiments of the invention and, together with the description, serve to explain the principles of the invention.

DETAILED DESCRIPTION OF THE PREFERRED EMBODIMENTS

Reference will now be made in detail to preferred embodiments of the invention, examples of which are illustrated in the accompanying drawings. Wherever convenient, the same reference numbers will be used throughout the drawings to refer to the same or like parts.

ENVIRONMENT

Figure 1:
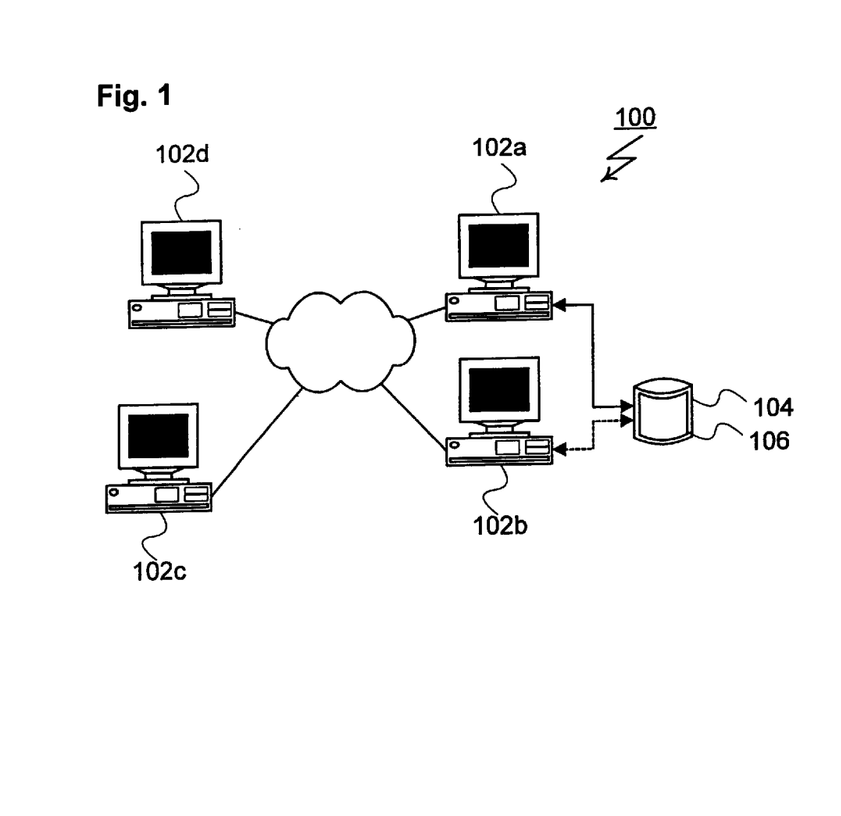
FIG. 1 is a block diagram of a computer cluster shown as an exemplary environment for an embodiment of the present invention.

In FIG. 1, an SSI computer cluster is shown as a representative environment for the present invention and is generally designated 100. SSI computer cluster 100 includes a series of computer systems referred to as nodes, of which nodes 102a through 102d are representative. Nodes 102 are intended to be representative of an extremely wide range of computer system types including personal computers, workstations and mainframes. SSI computer cluster 100 may include any positive number of nodes 102. For the described embodiment, nodes 102 are configured to provide a single system image, and operate under control of UNIX® or UNIX-like operating systems.

SSI cluster 100 includes a disk 104. Disk 104 is configured to provide read/write access to node 102a. For this reason, node 102a is referred to as the active server node 102a of disk 104. For the illustrated embodiment, disk 104 is dual ported. This allows SSI cluster 100 to reconfigure disk 104 so that read/write access is shifted to node 102b. This allows node 102b to replace active server node 102a in the event of failure of active server node 102a. For this reason, node 102b is referred to as the standby server node 102b of disk 104. In general, it should be appreciated that disk 104 is intended to be representative of a wide range of mass storage devices and is specifically not intended to be limited to disk drive technologies. Disk 104 may be singly, dually or multiply ported to provide any number of standby server nodes 102b. SSI cluster 100 may include any number of disks 104 without departing from the spirit of the present invention.

Disk 104 may be configured to include one or more filesystems. To simplify this description, it will be assumed, without loss of generality, that disk 104 is formatted to include only a single filesystem 106. For the described embodiment, filesystem 106 may be any filesystem type for which a vfs (virtual file system) interface is available. Example of suitable filesystem types include VXFS, s5fs, ufs, and FAT.

Figure 2:
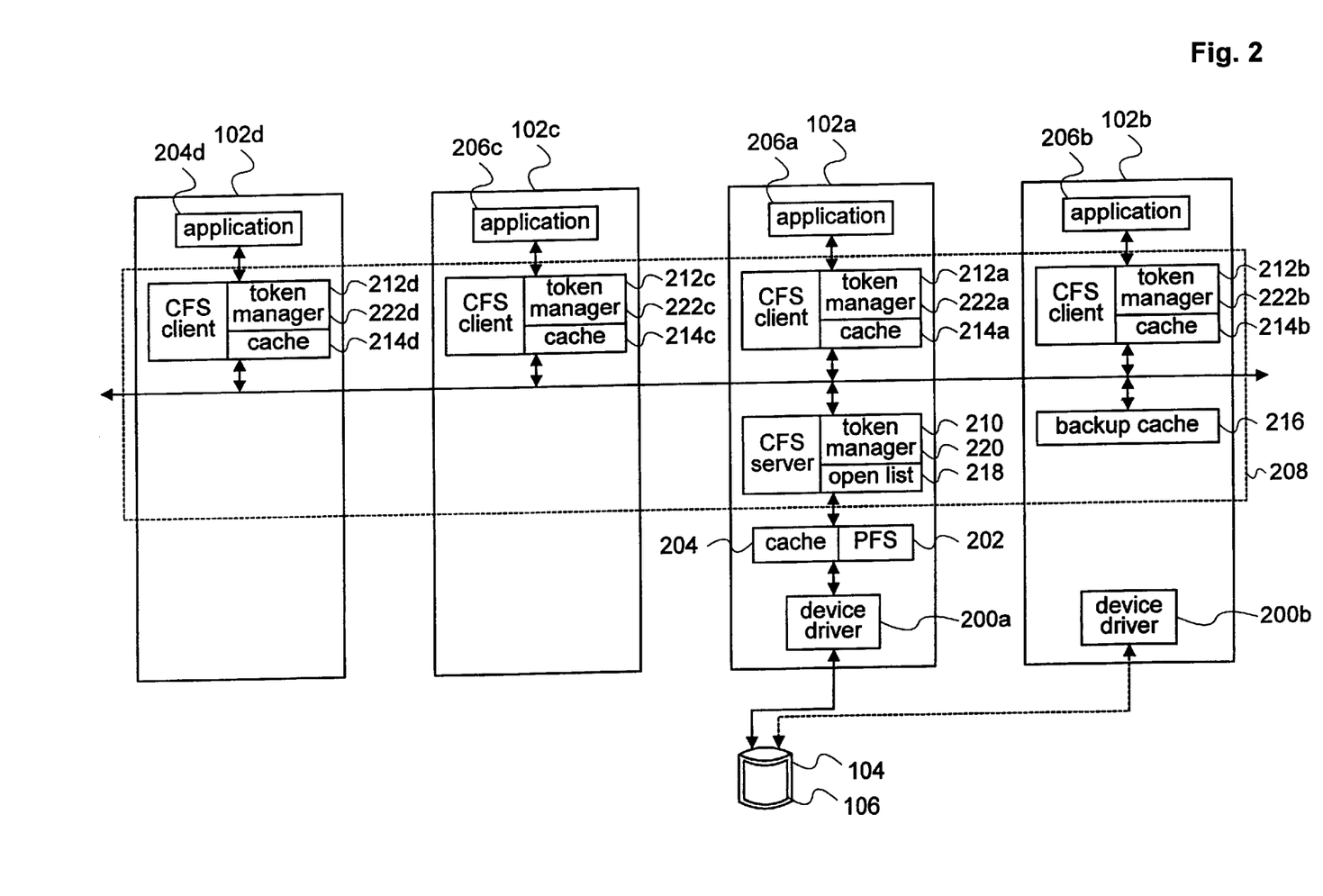
FIG. 2 is a block diagram showing the interaction between application processes and a filesystem using the cluster file system (CFS) of an embodiment of the present invention.

FIG. 2 shows, in symbolic form, a series of software components that are included in SSI cluster 100. In FIG. 2, it may be seen that active server node 102a and standby server node 102b include device drivers 200a and 200b, respectively. Device drivers 200 perform the low level functions required for interaction with disk 104. Active server node 102a also includes a physical filesystem (PFS) 202. PFS 202 is intended to be representative of vfs type filesystems as used in modern UNIX implementations. PFS 202 provides a set of vfs operations for manipulating filesystem 106. PFS 202 also provides a set of vnode operations for manipulating files located within filesystem 106. PFS 202 is created by active server node 102a as part of the process of mounting filesystem 106. Existence of PFS 202 within active server node 102a indicates that filesystem 106 is mounted, or available within, active server node 102a. PFS 202 typically includes a PFS data cache 204. PFS data cache 204 increases the performance of PFS 202 by caching data for filesystem 106.

Node 102 each include a respective application process 206a through 206d. Application processes 206 are intended to be representative clients of filesystem 106. Within SSI cluster 100, application processes 206 access filesystem 106 using a cluster filesystem (CFS) 208. As shown in FIG. 2, CFS 208 includes a CFS server instance 210 and a series of CFS client instances 212a through 212d. Active server node 102a creates an instance of CFS server instance 210 for each mounted filesystem. For the example or FIG. 2, this means that a single instance of CFS server instance 210 has been created for filesystem 106.

Nodes 102 create instances of CFS client instance 212 to allow application processes 206 to access filesystem 106. Preferably, this is done in a dynamic fashion, with each node 102 creating an instance of CFS client instance 212 as filesystem 106 is initially accessed in the node 102. In the example or FIG. 2, this means that CFS client instances 212a through 212d have been created for node 102a through 102d, respectively.

CFS 208 is a stackable filesystem and acts as an intermediate layer between application processes 206 and PFS 202. CFS client instances 212 provide the same set of vfs and vnode operations provided by PFS 202. Application processes 206 manipulate filesystem 106 and files located in filesystem 106 using the vfs and vnode operations provided by CFS client instances 212. CFS client instances 212 transmit the operations performed by application processes 206 to CFS server instance 210. CFS server instance 210, in turn, invokes PFS 202 to perform the requested operation on filesystem 106.

CFS 208 caches filesystem data within CFS client instances 212. For this purpose, CFS client instances 212 are shown to include respective client data caches 214a through 214d. CFS 208 also includes a backup server cache 216. For some operational modes, CFS 208 uses backup server cache 216 to store copies of modified file data stored at active server node 102. Typically, but not necessarily, backup server cache 216 will be included in standby server node 102b. For this reason, node 102b may be referred to as the backup cache node 102b. It should be appreciated, however, that backup server cache 216 may be included within any node 102 that is remote from CFS server instance 210. The operation of client data caches 214 and backup server cache 216 is more fully described in later portions of this document.

CFS 208 maintains an open list 218 within CFS server instance 210. Open list 218 is a data structure that records, for each open file, the identity of the CFS client instances 212 on which the file is open. Open list 218 also records the manner in which each open file is opened within each CFS client instance 212. Open list 218 is organized on a per-file basis. In this way, open list 218 can be used to find all nodes 102 that currently have a given file in an open state.

SSI cluster 100 includes a token manager component. In FIG. 2, the token manager component is shown as server token manager portion 220 and client token manager portions 222a through 222d. CFS server instance 210 and CFS client instances 212 use server token manager portion 220 and client token manager portions 222 to ensure coherent access to filesystem 106. Server token manager portion 220 and client token manager portions 222 provide this coherency by logically associating tokens with individual portions of a file's data. Tokens may also be associated with an attribute of a file or filesystem (such as size or modification time).

To access the data or attributes of a file included in filesystem 106, a CFS client instance 212 must acquire the appropriate token or tokens from CFS server instance 210. CFS client instances 212 request tokens using client token manager portions 222. Client token manager portions 222, in turn, communicate these requests to server token manager portion 220 and CFS server instance 210. CFS server instance 210 examines each request received by server token manager portion 220. CFS server instance 210 then uses server token manager portion 220 to grant or deny tokens depending on whether the requested tokens may be granted without compromising the coherency of filesystem 106. Server token manager portion 220 then communicates each response of CFS server instance 210 to the requesting client token manager portion 222 and CFS client instance 212.

To increase concurrency, SSI cluster 100 provides several different types of tokens. Preferably, these token types include read-only and read-write types. This allows multiple CFS client instances 212 to simultaneously read a file or file system attribute but prevents more than a single CFS client instance 212 from simultaneously modifying file or file system attributes. SSI cluster 100 also preferably includes range token types. Range tokens are associated with portions of a file. This allows multiple CFS client instances 212 to simultaneously modify different parts of the same file.

CFS FILESYSTEM DATA INTEGRITY

An embodiment of the present invention provides a system that protects the integrity of cached filesystem data during failure of one or more nodes 102. Preferably, this system is configurable on filesystem-by-filesystem basis to provide one of two levels of data protection: data integrity level one or data integrity level two.

Data integrity level two ensures that all changes made to filesystem 106 survive the failure of any single node 102 within SSI cluster 100. Data integrity level one is similar to data integrity level two. In data integrity level one, however, changes made prior to a single node failure are only guaranteed if there are any application processes 206 which may have seen the changes and survive the node failure. Thus, changes may be lost due to a single node failure if there are no surviving application processes 206 that may have either created or read the changes.

CFS 208 is configured to provide operational modes for data integrity level one protection of non-shared files, data integrity level one protection of shared files, data integrity level two protection of non-shared files and data integrity level two protection of shared files. CFS server instance 210 controls the modes used on a file-by-file basis. For each file, CFS server instance 210 arranges for file accesses to be performed in an operational mode that reflects the data integrity level of filesystem 106 and the file's sharing state.

Figure 3:
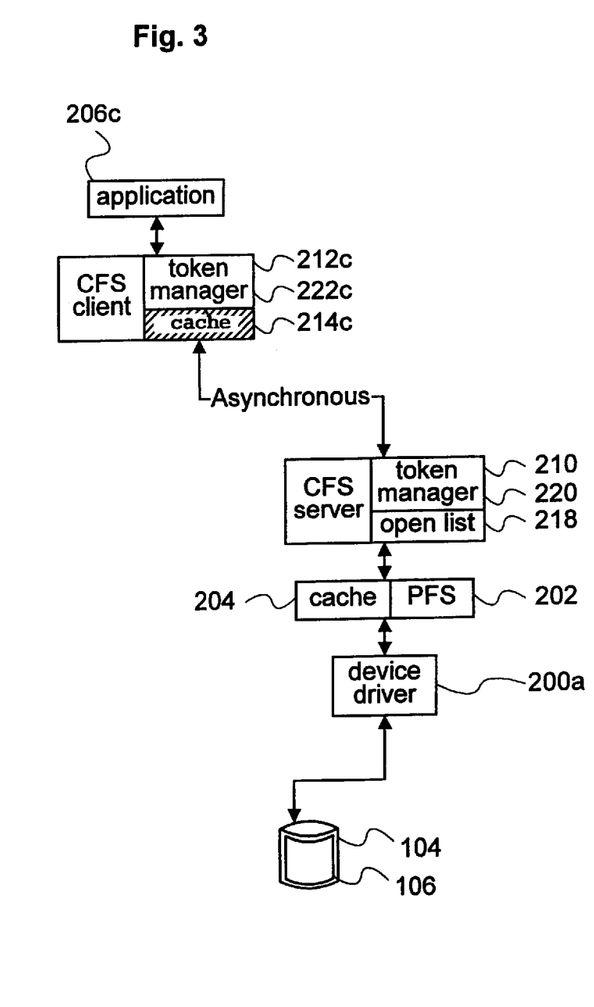
FIG. 3 is a block diagram showing an embodiment of the cluster file system configured to provide data integrity level one protection to non-shared files.

The operational mode for data integrity level one protection of non-shared files is better appreciated by reference to FIG. 3. In FIG. 3, it is assumed that CFS 208 has been configured to provide data integrity level one protection for filesystem 106. Additionally, it is assumed that a representative file within filesystem 106 has been opened by application 206c on node 102c. Client data cache 214c is shown with cross-hatching. This is intended to indicate that client data cache 214c is active and may include portions of the representative file. Client data cache 214c and CFS server instance 210 are asynchronously connected. This means that changes made to client data cache 214c may not be immediately propagated to CFS server instance 210.

Figure 4:
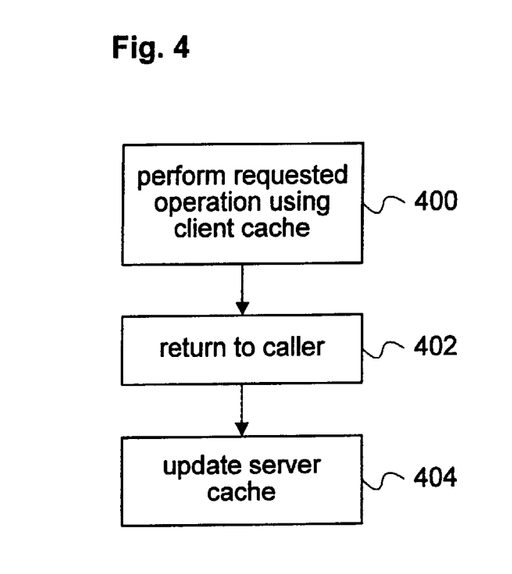
FIG. 4 is a flowchart showing steps performed by a CFS client instance during a write system call for the cluster filesystem configuration of FIG. 3.

The asynchronous propagation of changes illustrated in FIG. 3 is better understood by reference to FIG. 4. FIG. 4 shows relevant tasks performed by CFS client instance 212c in response to a write system call performed by application 206c involving filesystem 106. CFS client instance 212c responds to this request by storing the data to be written in client data cache 214c (see step 400). CFS client instance 212c then allows the write system call to return to application 206c (see step 402). This permits application 206c to continue execution. CFS client instance 212, at some later time, propagates the changes made during the write system call to CFS server instance 210 (see step 404). CFS server instance 210 will immediately send any data it receives from CFS client instances 212 to PFS 202. PFS 202 will typically cache the modified file data in PFS data cache 204.

The asynchronous propagation of changes between client data cache 214c and CFS server instance 210 means that the write system call (and other data modifying system calls) are allowed to complete before changes in client data cache 214c are propagated to CFS server instance 210. During the time between completion of a system call and subsequent propagation, changed data may be lost if client node 102c or CFS client instance 212 fails. Changed data is protected, however, against failure of active server node 102a or CFS server instance 210 (because changed data remains cached in client data cache 214c until it is written to disk).

CFS client instance 212c and CFS server instance 210 manage data from filesystem 106 using fixed size quanta known as pages. CFS client instance 212c and CFS server instance 210 exchange these pages to provide CFS client instance 212c with data, and to propagate changed data back to CFS server instance 210. To increase concurrency, CFS client instances 212 are preferably configured to manage filesystem pages using a series of states. This is more easily understood by reference to FIG. 5 where a page state diagram is shown and is generally designated 500. State diagram 500 includes four separate states: a clean state 502, a dirty state 504, a shared dirty state 506 and a shared dirty sync state 508.

Figure 5:
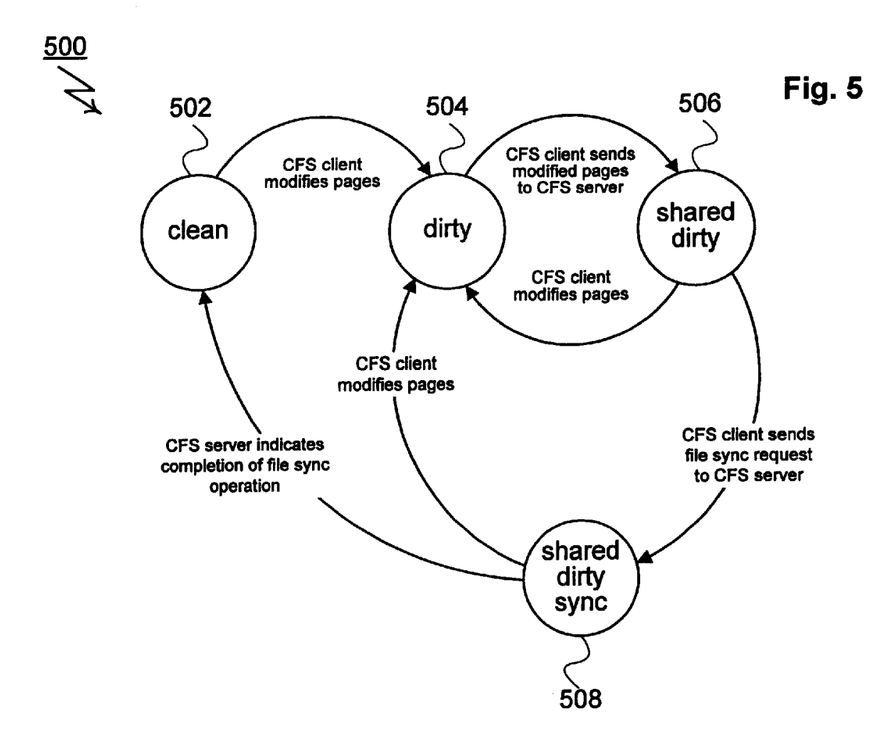
FIG. 5 is a state diagram showing the relationship between a set of filesystem page states used by an embodiment of the present invention.

Clean state 502 represents pages from filesystem 106 that are cached, without modification, in client data cache 214. CFS client instance 212 classifies pages in client data cache 214 as being in clean state 502 when they are initially received from CFS server instance 210. CFS client instance 212 also reclassifies pages in client data cache 214 as being in clean state 502 when they have been reliably synchronized with filesystem 106.

Dirty state 504 represents pages from filesystem 106 that are cached, in modified form, exclusively in a client data cache 214. CFS client instance 212 classifies pages in client data cache 214 as being in dirty state 504 whenever they are modified. This means that pages in any state will transition to dirty state 504 whenever they are modified.

Shared dirty state 506 represents pages from filesystem 106 that are cached, in modified form, in client data cache 214 and have been sent to PFS 202. CFS client instance 212 classifies pages in client data cache 214 as being in shared dirty state 506 after CFS client instance 212 has propagated the pages back to CFS server instance 210 which sends the data to PFS 202. PFS 202 typically caches the data in PFS data cache 204.

Shared dirty sync state 508 represents modified pages that are cached in client data cache 214 and in PFS data cache 204 and are in the process of being written to filesystem 106. CFS client instance 212 reclassifies pages in client data cache 214 from shared dirty state 506 to shared dirty sync state 508 after CFS client instance 212 sends a request to CFS server instance 210 for the pages in PFS data cache 204 to be written to filesystem 106.

Figure 6:
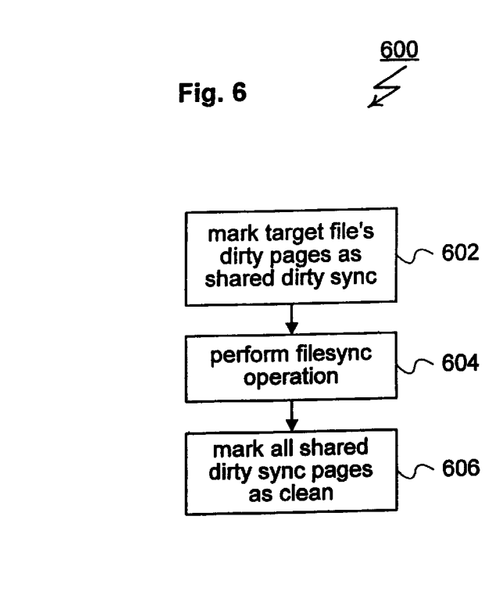
FIG. 6 is a flowchart showing steps performed by a CFS client instance during a filesync operation for the cluster filesystem configuration of FIG. 3.

CFS client instance 212 is preferably configured to limit the number of pages included in client data cache 214. The limit used can be based on a number of considerations including the system memory pressure (i.e., the total memory in use) at client node 102c. CFS client instance 212 is also preferably configured to periodically reduce the number of pages included in client data cache 214 or to reduce the number of pages in client data cache 214 during otherwise idle periods. To reduce the number of pages in CFS client data cache 214, CFS client instance 212 performs a filesync operation to move pages to clean state 502 so they may be safely used for other purposes without losing changed data. An embodiment of this method is shown in FIG. 6 and is generally designated 600.

CFS client instance 212 initiates filesync method 600 by marking each of the target file's shared dirty pages as shared dirty sync (see step 602). In the context of FIG. 5, this corresponds to a transition from shared dirty state 506 to shared dirty sync state 508.

After marking pages as shared dirty sync, CFS client instance 212 sends a request to CFS server instance 210 for all of these pages which have already been propagated to PFS 202, to be written to filesystem 106. Upon receiving the request from CFS client instance 212, CFS server instance 210 sends a request to PFS 202 for any changed data that it has cached to be written to filesystem 106 (see step 604).

When PFS 202 indicates that all cached changes have been written to disk, CFS client instance 212 remarks all of the target file's shared dirty sync pages as clean (see step 606). In the context of FIG. 5, this corresponds to a transition from shared dirty sync state 508 to clean state 502. The pages that are remarked during step 606 are, at most, a subset of the pages that were marked as shared dirty sync pages in step 602. This follows because modifications to the target file may have caused CFS client instance 212 to mark shared dirty sync pages as dirty between steps 602 and 606.

Figure 7:
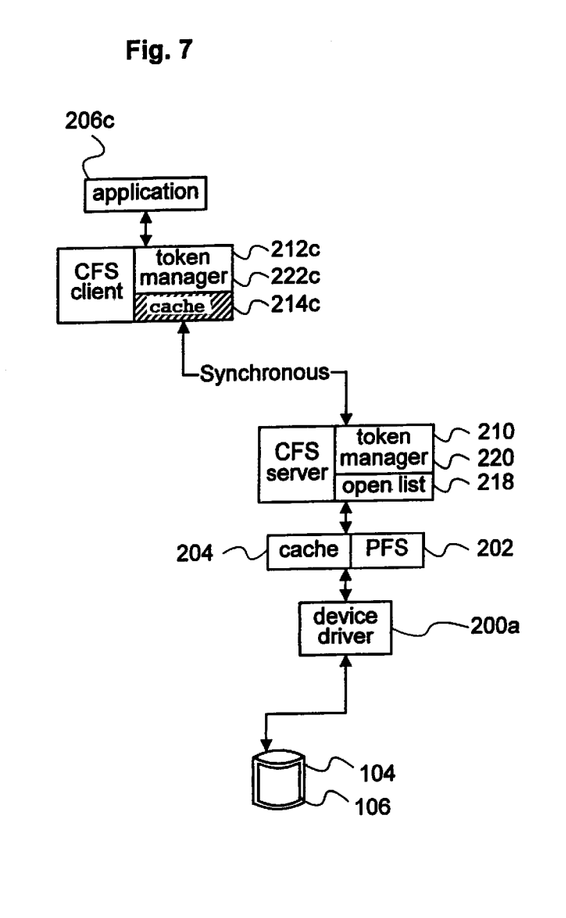
FIG. 7 is a block diagram showing an embodiment of the cluster file system configured to provide data integrity level two protection to non-shared files.

The operational mode for data integrity level two protection of non-shared files is better appreciated by reference to FIG. 7. In FIG. 7, it is assumed that CFS 208 has been configured to provide data integrity level two protection for filesystem 106. Additionally, it is assumed that a representative file within filesystem 106 has been opened by application 206c on node 102c. Client data cache 214c is shown with cross-hatching. This is intended to indicate that client data cache 214c is active and each may include portions of the representative file. Client data cache 214c and CFS server instance 210 are synchronously connected. This means that changes made to client data cache 214c are immediately propagated to CFS server instance 210. CFS server instance 210 will immediately send any data it receives from CFS client instances 212 to PFS 202. PFS 202 will typically cache the modified file data in PFS data cache 204.

Figure 8:
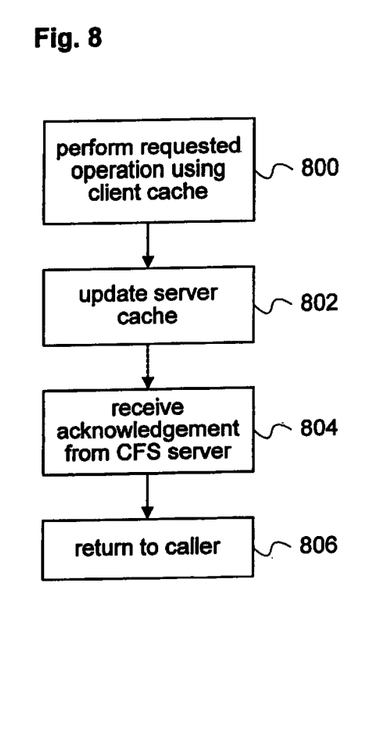
FIG. 8 is a flowchart showing steps performed by a CFS client instance during a write system call for the cluster filesystem configuration of FIG. 7.

The synchronous propagation of changes illustrated in FIG. 7 is better understood by reference to FIG. 8. FIG. 8 shows relevant tasks performed by CFS client instance 212c in response to a write system call performed by application 206c involving filesystem 106. CFS client instance 212c responds to this request by storing the data to be written in client data cache 214c (see step 800). CFS client instance 212 then forwards the pages modified by the write system call to CFS server instance 210 (see step 802).

CFS server instance 210 synchronously sends the data it receives from CFS client instances to PFS 202. Once the pages are stored, CFS server instance 210 sends an acknowledgment message to CFS client instance 212. CFS client instance 212 receives the acknowledgment message from CFS server instance 210 (see step 804). In general, it should be appreciated that steps 802 and 804 are consecutive in a logical, but not always temporal, sense. This means that CFS client instance 212 may perform a range of tasks, unrelated to the current discussion, between steps 802 and 804. Once the acknowledgment message is received, CFS client instance 212c allows the write system call to return to application 206c (see step 806). This allows application 206c to continue execution.

The synchronous propagation of changes between client data cache 214c and CFS server instance 210 means that the write system call (and other data modifying system calls) are not allowed to complete before changes in client data cache 214c are propagated to CFS server instance 210. Upon completion of the write system call, the changed data is protected against any single failure of nodes 102, since the changed data remains cached in client data cache 214c and PFS data cache 204 until it is written to filesystem 106. Changed data may only be lost in the event of a multiple node failure that includes both client node 102c and active server node 102a.

Figure 9:
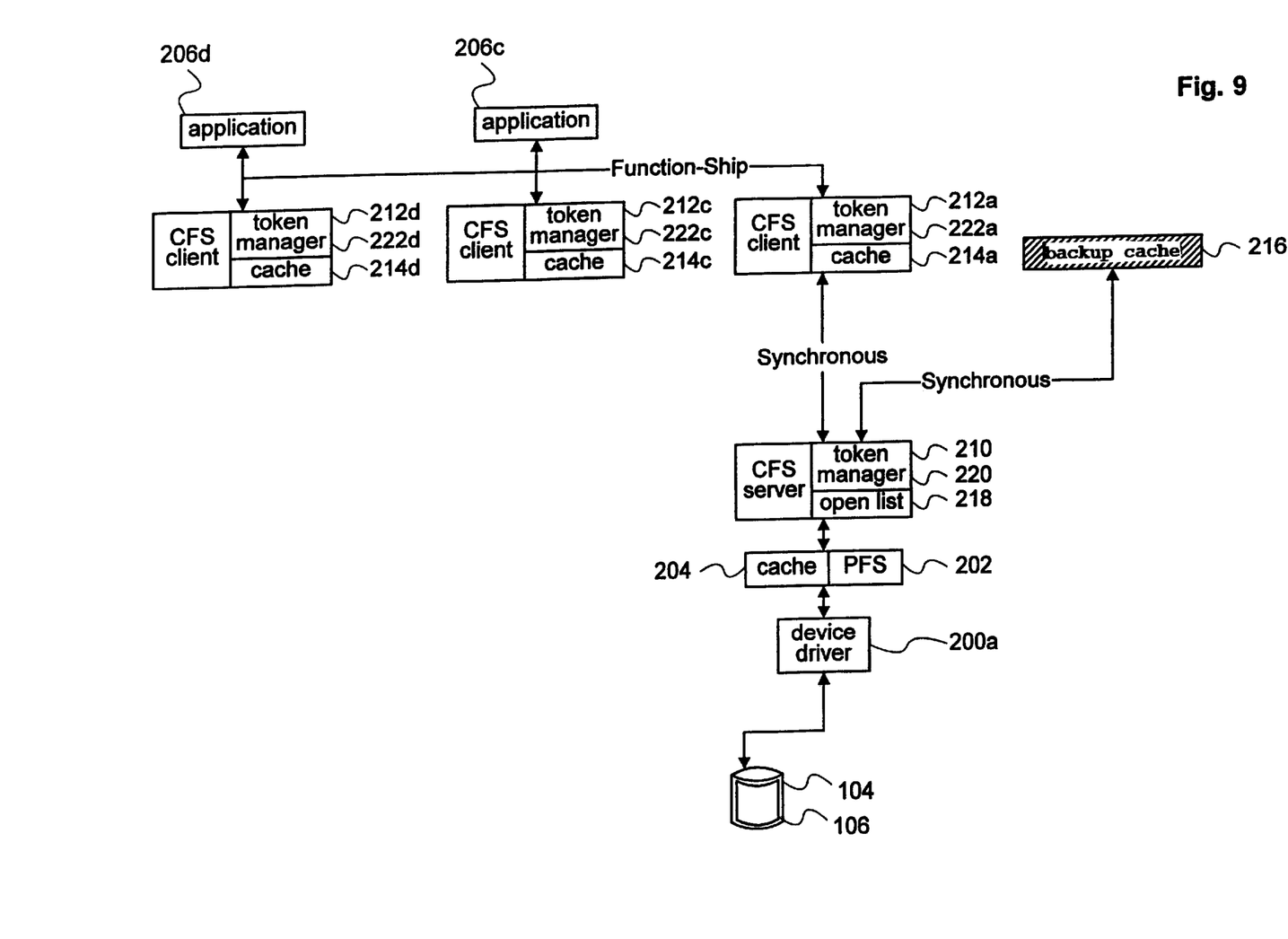
FIG. 9 is a block diagram showing an embodiment of the cluster file system configured to provide data integrity level one or two protection to shared files.

The operational mode for protection of shared files at data integrity levels one or two is better appreciated by reference to FIG. 9. In FIG. 9, it is assumed that a representative file within filesystem 106 has been opened by application 206c on node 102c and application 206d on node 102d. CFS client instances 212c and 212d are connected to CFS server instance 210 with a function-ship connection. This means that CFS client instances 212c and 212d function-ship all file operations to active server node 102a where they are performed by CFS client instance 212a. Backup server cache 216 is shown with cross-hatching. This indicates backup server cache 216 is active and may include portions of the representative file. CFS client data cache 214a and CFS server instance 210 are synchronously connected. This means that changes made to CFS client data cache 214a are synchronously propagated to CFS server instance 210 which immediately sends the data to PFS 202. PFS 202 will typically cache the modified file data in PFS data cache 204. Additionally, CFS server instance 210 is synchronously connected to backup server cache 216. This means that changes propagated to CFS server instance 210 are synchronously sent to backup server cache 216.

Figure 10:
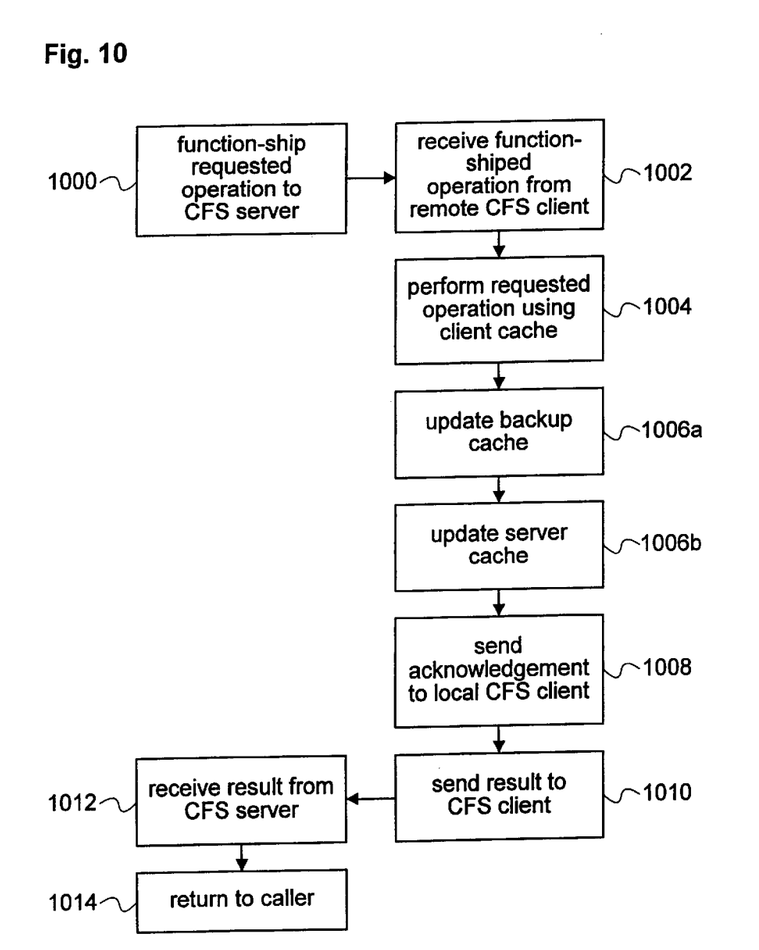
FIG. 10 is a flowchart showing steps performed by a CFS client instance and CFS server instance during a write system call for the cluster filesystem configuration of FIG. 9.

The synchronous propagation of changes illustrated in FIG. 9 is better understood by reference to FIG. 10. FIG. 10 shows relevant tasks performed by CFS client instance 212c and CFS server instance 210 in response to a write system call performed by application 206c involving filesystem 106.

As shown, CFS client instance 212c responds to a request of this type by function-shipping the requested write to be performed at active server node 102a (see step 1000). CFS client instance 212c performs the function-shipping of step 1000 by sending a message to CFS client instance 212a identifying the requested operation and its associated parameters. CFS client instance 212a receives the request in step 1002. CFS client instance 212a then performs the requested operation using client data cache 214a (see step 1004).

CFS client instance 212a then forwards the pages modified by the write system call to CFS server instance 210. CFS server instance 210 synchronously sends the data it receives from CFS client instance 212 to both PFS 202 (see step 1006a) and to backup server cache 216 (see step 1006b). PFS will typically cache the modified file data in PFS data cache 204. Backup server cache 216 stores each of the pages received from CFS server instance 210 in shared dirty state 506. Upon completion, CFS server instance 210 sends an acknowledgment to CFS client instance 212a (see step 1008).

Receipt of the acknowledgment from CFS server 210 informs CFS client instance 212a that the modified pages are stored in two separate places: within PFS 202 and within backup server cache 216. This means that the modifications are protected against any single failure.

The result of the write system call performed by CFS client instance 212a is sent back to CFS client instance 212c (see step 1010). The result message is received by CFS client instance 212c in step 1012. Once the result message is received, CFS client instance 212c allows the write system call to return to application 206c (see step 1014). This permits application 206c to continue execution.

The combination of function-shipping and synchronous propagation of changes means that the write system call (and other data modifying system calls) is not allowed to complete before modified pages are stored within PFS 202 and backup server cache 216. As a result, modifications by completed write system calls are protected against any single failure. Changed data may only be lost in event of a multiple node failure that includes both the active server node 102a and backup cache node 102b.

Figure 11:
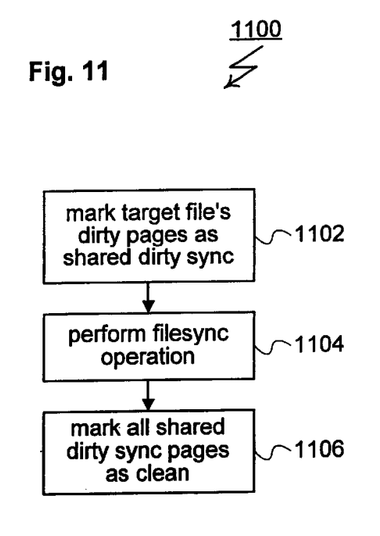
FIG. 11 is a flowchart showing steps performed by a CFS server instance during a filesync operation for the cluster filesystem configuration of FIG. 9.

CFS server instance 210 is preferably configured to limit the number of pages stored at backup server cache 216. The limit used can be based on a number of considerations including the system memory pressure (i.e., the total memory in use) at backup cache node 102b (the node that includes backup server cache 216). CFS server instance 210 is also preferably configured to periodically reduce the number of pages included in backup server cache 216 including during otherwise idle periods. To reduce the number of pages in backup server cache 216, CFS server instance 210 performs a filesync operation. An embodiment of this method is shown in FIG. 11 and is generally designated 1100.

CFS server instance 210 initiates filesync method 1100 by selecting a target file for the filesync operation. The file chosen is one that has modified file data stored at backup server cache 216 (implying that the modifications have also been sent to PFS 202). First, CFS server instance 210 notifies backup cache node 102b to mark each of the target file's pages stored within the backup server cache 216 as shared dirty sync state (see step 1102). In the context of FIG. 5, this corresponds to a transition from shared dirty state 506 to shared dirty sync state 508. After backup cache node 102b has marked the pages in backup server cache 216 as shared dirty sync, CFS server instance 210 sends a request to PFS 202 for any changed data it has cached to be written to filesystem 106 (see step 1104).

When PFS 202 indicates that it has written all of its cached data in PFS data cache 204 to filesystem 106, CFS server instance 210 notifies backup cache node 102b to remark all of the target file's pages stored within backup server cache 216 as clean (see step 1106). In the context of FIG. 5, this corresponds to a transition from shared dirty sync state 508 to clean state 502.

CLIENT AT SERVER

Client-at-server refers to the case where application process 206, CFS client instance 212 and CFS server instance 210 are all co-located within the same node 102. For data integrity level one protection of non-shared files, CFS 208 is configured to use the operational mode for data integrity level two protection of shared files whenever a client-at-server situation exists. This ensures that cached modifications of filesystem data will not be lost during any single failure.

For data integrity level two protection of non-shared files and a client-at-server situation exists, CFS 208 is configured to not maintain modified file data in client data cache 214a after CFS client instance 212a propagates the modified file data to CFS server 210. Thus, after CFS server instance 210 sends the data to PFS 202, CFS client instance 212a is not required to continue caching the propagated data. This allows client node 102a to avoid consuming system memory for caching filesystem changes that would either be redundantly cached in PFS data cache 204 or reflected on disk.

SHARED MODE DETECTION

Figure 12:
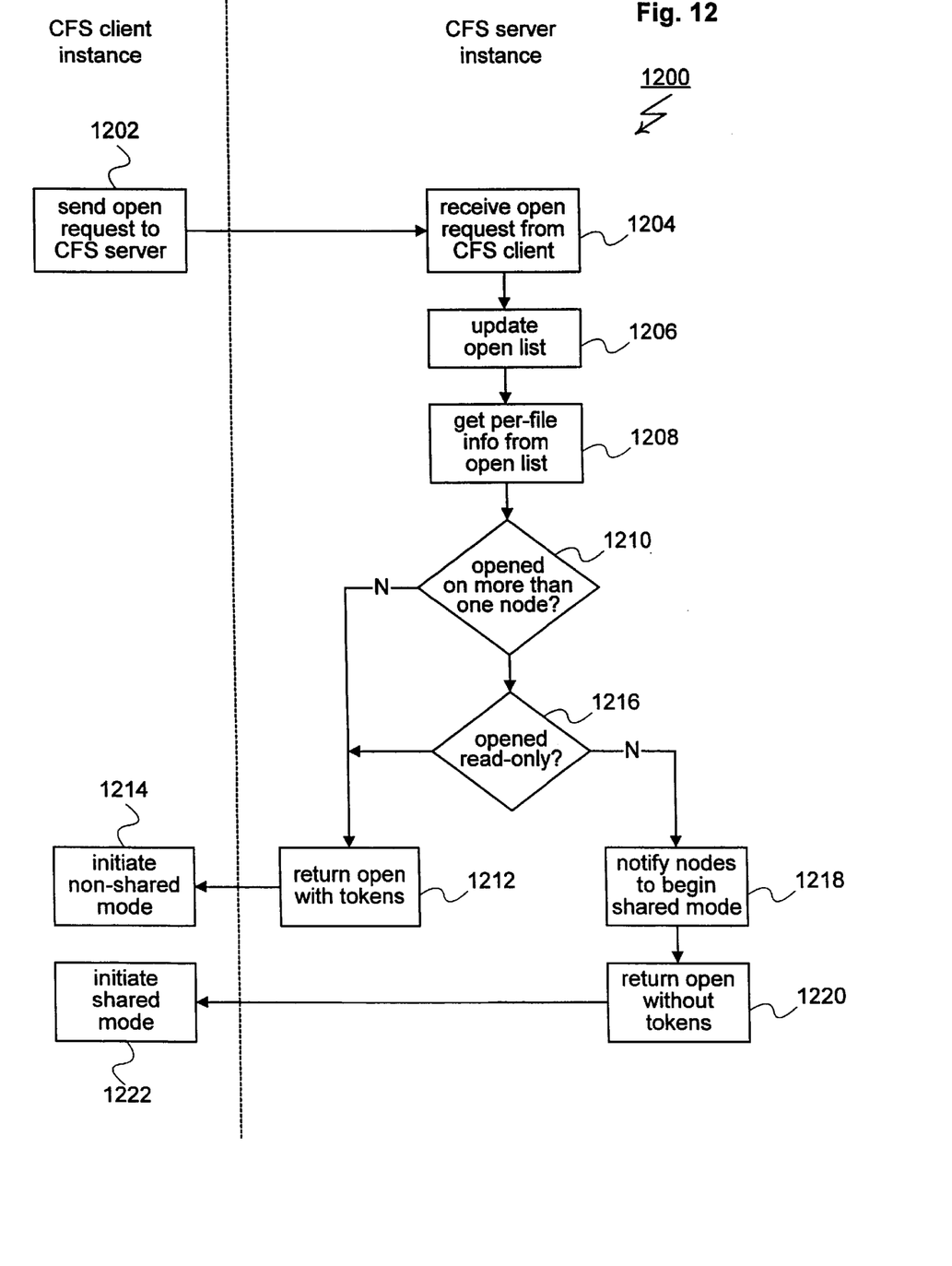
FIG. 12 is a flowchart showing steps performed by a CFS client instance and CFS server instance to perform shared-mode detection during an open operation.

An embodiment of the present invention includes a system for detecting file sharing within SSI cluster 100. Detection of file sharing allows CFS 208 to dynamically switch between shared and non-shared operational modes, on a file-by-file basis, depending on the sharing state of each file. For the described embodiment, a file's sharing state is updated during both file open and close operations. In FIG. 12, an embodiment of a sharing detection method used during a file open is shown and is generally designated 1200. To begin method 1200, CFS client instance 212 sends an open request to CFS server instance 210 (see step 1202). The open request identifies the file to be opened (the target file) and may include other parameters, such as the requested access permissions (e.g., read-only, or read-write).

In step 1204, CFS server instance 210 receives the open request from CFS client instance 212. CFS server instance 210 then uses the open request to update open list 218 (see step 1206). As described previously, open list 218 is a data structure that describes the sharing state of the file currently open on CFS server instance 210. Open list 218 is organized on a file-by-file basis and records, for each file, the identity of each CFS client instance 212 on which the file open and the permissions granted for the open. In step 1206, CFS server instance 210 adds the identity of the CFS client instance 212 from which the open request was received to the entry for the target file in open list 218.

After updating open list 218, CFS server instance 210 retrieves the per-file information corresponding to the target file from open list 218 (see step 1208). CFS server instance 210 uses the retrieved information to perform a series of tests. For the first of these tests, CFS server instance 210 determines if the requested open operation will cause the target file to be opened on more than a single node 102 (see step 1210). If not, method 1200 continues at step 1212 where CFS server instance 210 sends a response message to CFS client instance 212. The response message includes file access tokens that allow CFS client instance 212 to begin caching data from the target file in client data cache 214. CFS client instance 212 receives the response message sent by CFS server instance 210 and, if necessary, initiates non-shared mode operation (see step 1214). Initiation of non-shared mode operation if non-shared mode operation has already been done by a previous open on that client node 102.

The alternate path from step 1210 is step 1216. CFS server instance 210 reaches this step after determining, in step 1210, that the requested open operation will cause the target file to be opened on more than a single node 102. In step 1216, CFS server instance 210 determines if the permissions granted for all opens (including the requested open) on the target file conflict, i.e., there any opens with permissions to write to the file. If not, execution of method 1200 continues with steps 1212 and 1214 where CFS client instance 212 initiates, if necessary, operation in non-shared mode.

The alternate path from step 1216 is step 1218. CFS server instance 210 reaches this step after determining, in step 1216 that there are conflicting opens of the target file. In step 1218, CFS server instance 210 notifies, if necessary, the node(s) which already have the file open to initiate shared mode operation for the file. Notification is not necessary if already done by previous open or there are no nodes to notify. The notification means that CFS client instances 212 must return any tokens they have for the file (consequently un-caching any data for the file) and functionship all subsequent file operations.

In step 1220 CFS server instance 210 sends a response message to CFS client instance 212 to initiate non-shared mode operation, if necessary. The response message does not include the file tokens included in the response sent in step 1212. To initiate shared mode, CFS client instance 212 is informed that it must return any tokens it has for the file (consequently un-caching any data for the file) and functionship all subsequent file operations.

Method 1200 allows CFS 208 to determine the operational mode that will be used for a file at the time that the file is opened. The same analysis may be beneficially applied during close operations. The result being that closes that cause a file to become non-shared will result in transition from shared to non-shared operational modes.

Figure 13:
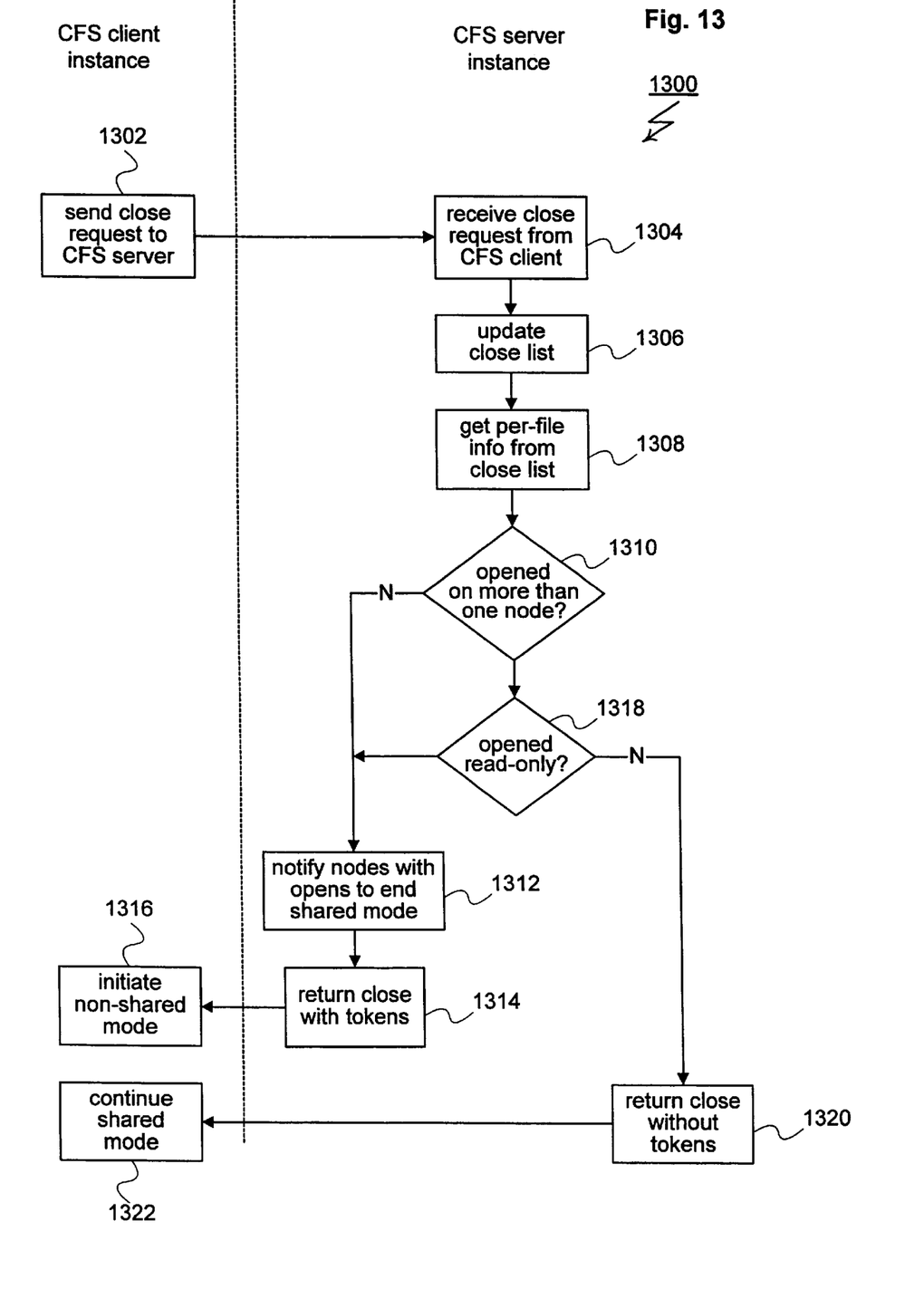
FIG. 13 is a flowchart showing steps performed by a CFS client instance and CFS server instance to perform shared-mode detection during a close operation.

In FIG. 13, an embodiment of a sharing detection method used during a file close is shown and is generally designated 1300. Method 1300 is generally similar to method 1200. The two methods differ, however, in terms of the actions that are performed after sharing has been determined to not exist or to exist. In the former case (i.e., where CFS server instance 210 determines that sharing does not exist) CFS server instance 210 notifies, if necessary, the node(s) 102 that already have the file open to end shared mode operation for the file (see step 1312). Notification is not necessary if already done by previous open or there are no nodes to notify. The notification means that CFS client instances 212 may request tokens for the file and begin caching data for the file. CFS client instances 212 also perform file modifying operations locally and end function-shipping of file operations.

CFS server instance 210 then sends a response message to CFS client instance 212 (see step 1314). The response message includes file access tokens that allow CFS client instance 212 to begin caching data from the target file in client data cache 214. CFS client instance 212 receives the response message sent by CFS server instance 210 and initiates non-shared mode operation, if necessary (see step 1316).

The alternative to steps 1312 through 1316 is step 1320 and is reached when CFS server determines that file sharing exists. In step 1320 CFS server instance 210 sends a response message to CFS client instance 212. The response message does not include the file tokens included in the response sent in step 1212. CFS client instance 212 receives the response message sent by CFS server instance 210 continues operation in shared mode, if it still has opens on the file (see step 1322) Operation in shared mode is not necessary if there are no more opens on the client node 102.

The close mechanism may also be modified so that the transition from shared to non-shared operational modes is subject to a time delay. The time delay prevents the transition from shared to non-shared operational modes until a predefined interval has elapsed after the close of the last conflicting open. This adds a type of hysteresis to CFS 208 and prevents CFS 208 from unnecessarily switching between operational modes in the case that a file is closed and then quickly reopened.

PROCESS MIGRATION

In general, it is desirable to allow applications 206 to migrate between nodes 102. In cases where an application 206 opens a file and then migrates between nodes, CFS 208 will perform an open operation on the origin node, an open on the destination node and then a close on the origin node. It is easy to appreciate that the second open (assuming that the file is not opened read-only) will cause CFS 208 to entered shared mode operation. CFS 208 will then transition to non-shared operation following the close operation. For one embodiment of the present invention, CFS 208 may be configured to determine if any function-ship operations were performed during shared mode operation. If no function-ship operations were performed, the close causes a transition to non-shared mode operation with no delay. This avoids the expense of initiating shared mode operation for a short time duration following process migration.

CONCLUSION

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method for providing data integrity level one protection to changes made to a file against the loss of a node within a computer cluster having at least one server node and at least two client nodes, the method comprising the steps of:

storing a copy of information from the file in a client cache of a first client node of the at least two client nodes, wherein the information stored in the client cache can be accessed by processes running on the first client node;

storing a copy of information from the file in a client cache of a second client node of the at least two client nodes, wherein the information stored in the client cache can be accessed by processes running on the second client node;

executing a file change to the information stored in the client cache of the first client node and storing the file change in the client cache of the first client node;

asynchronously forwarding the file change from the client cache of the first client node to the at least one server node;

performing a filesync operation, wherein the filesync operation cause the server node to update the information in the file by including the file change.

2. The method of claim 1, further comprising the steps of:

executing a file change to the information stored in the client cache of the second client node and storing the file change in the client cache of the second client node; and asynchronously forwarding the file change from the client cache of the second client node to the at least one server node.

3. The method of claim 2 further comprising the step of:

performing a filesync operation, wherein the filesync operation cause the server node to update the information in the file by including the file change forwarded from the client cache of the second client node.

4. A method for protecting changes made to shared files against the loss of a node within a computer cluster, the method comprising the steps of:

caching, by a server node, a file change requested by a process executing on a first remote node;

synchronously forwarding, by the server node, the file change to a backup cache node, which is different from the first remote node;

caching, by the backup cache node, the file change;

performing, by the server node, a filesync operation, the filesync operation causing the server node to record the file change within a physical filesystem; and un-caching, by the backup cache node, the file change.

5. A method for providing data integrity level two protection to changes made to a file against the loss of a node within a computer cluster having at least one server node and at least two client nodes, the method comprising the steps of:

storing a copy of information from the file in a client cache of a first client node of the at least two client nodes, wherein the information stored in the client cache can be accessed by processes running on the first client node;

storing a copy of information from the file in a client cache of a second client node of the at least two client nodes, wherein the information stored in the client cache can be accessed by processes running on the second client node;

executing a file change to the information stored in the client cache of the first client node and storing the file change in the client cache of the first client node;

synchronously forwarding the file change from the client cache of the first client node to the at least one server node;

recording, by the server node, the file change within a filesystem;

acknowledging, by the server node, receipt of the file change and completion of recording.

6. The method of providing data integrity level two protection, as claimed in claim 5, further comprising:

synchronously forwarding the file change from the server node to a backup cache node; and caching, by the backup cache node, the file change.

7. The method of claim 5, further comprising the steps of:

executing a file change to the information stored in the client cache of the second client node and storing the file change in the client cache of the second client node; and synchronously forwarding the file change from the client cache of the second client node to the at least one server node.

8. The method of claim 7 further comprising the step of:

performing a filesync operation, wherein the filesync operation cause the server node to update the information in the file by including the file change forwarded from the client cache of the second client node.

* * * * *